Figure 5:
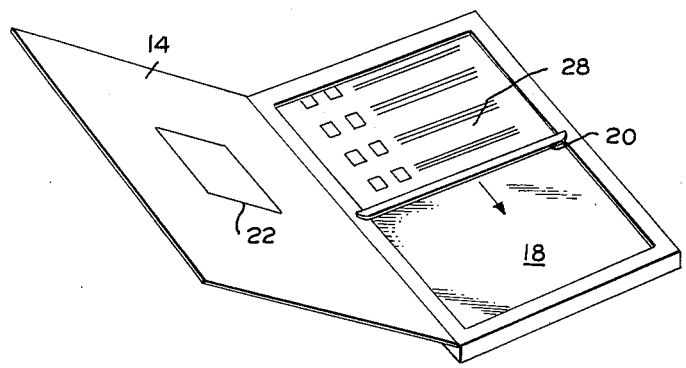

March 29, 1966  P. W. WEEKS ETAL  3,242,592
SURVEY DEVICE
Filed Oct. 28, 1964  2 Sheets-Sheet 1
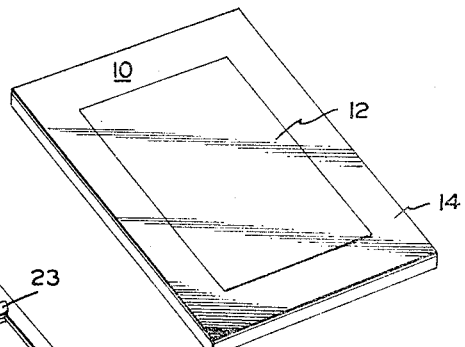
FIG.1
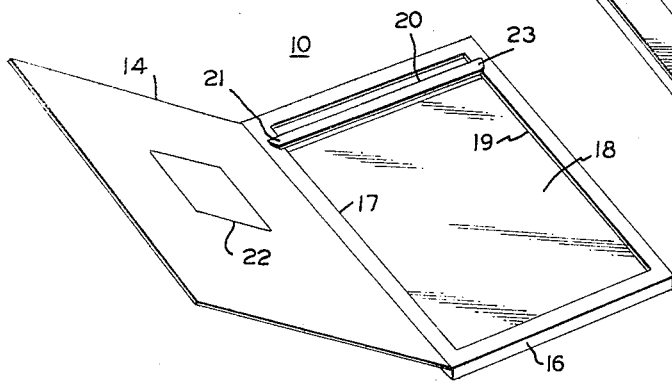
FIG.2
FIG.3
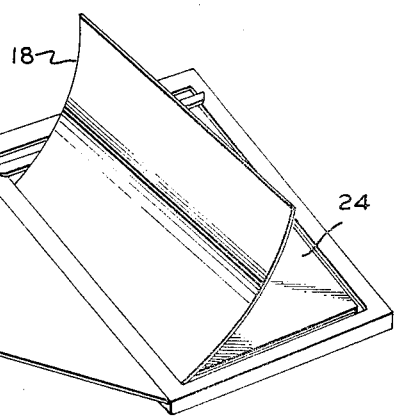
FIG.4
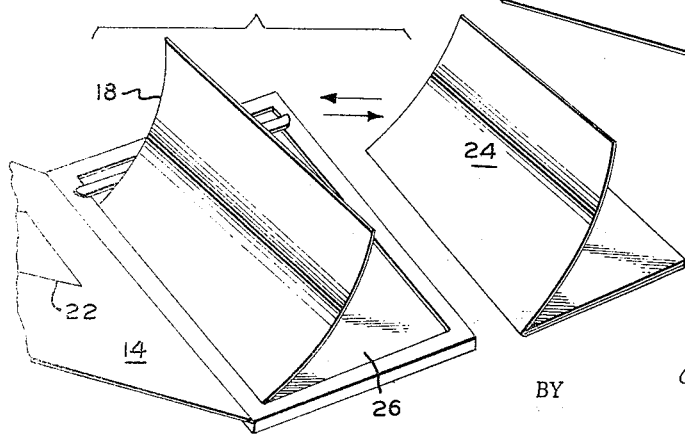
INVENTORS
PHILIP W. WEEKS
JOSEPH D. SIMPSON
BY *Albert T. Sraddus*
ATTORNEY March 29, 1966  P. W. WEEKS ETAL  3,242,592
SURVEY DEVICE Filed Oct. 28, 1964  2 Sheets-Sheet 2

INVENTORS
PHILIP W. WEEKS
JOSEPH D. SIMPSON

BY *Albert H. Graddis*

ATTORNEY

United States Patent Office 3,242,592
Patented Mar. 29, 1966

3,242,592
SURVEY DEVICE
Philip W. Weeks, Sparta, and Joseph D. Simpson, Elizabeth, N.J., assignors to Warner-Lambert Pharmaceutical Company, Morris Plains, N.J., a corporation of Delaware
Filed Oct. 28, 1964, Ser. No. 407,178
4 Claims. (Cl. 35—9)

This invention relates in general to survey devices and more particularly, to survey devices that test the degree of mental retention of an individual after visual examination of a particular exhibit.

The value of preliminary surveys in testing public reaction to a particular article, exhibit, issue, or the like is well known. These surveys have been found to be especially useful in screening consumer reaction in limited test areas to advertisement literature. By exposing advertising literature to prospective consumers of a product by survey in a test market area, it is possible to screen advertisements which may be poorly received by the public prior to the expenditure of large sums of money for fully promoting the product to be advertised. There is therefore, great advantage in exposing advertisement literature to prospective consumers by means of a test survey.

One problem with survey devices employed heretofore has been that the individuals being surveyed are usually afforded an opportunity to refer to the particular piece of literature being surveyed while answering the various questions of the survey. Such surveys fail to take into consideration the importance of mental retention which prospective consumers will ultimately base their reactions upon in purchasing the particular object being advertised.

It has now been found that a useful survey device such as may be prepared according to the practice of the present invention provides a simple and effective means for surveying mental retention of prospective consumers in testing responses to advertising literature, labels, and the like.

It is an object of this invention, therefore, to provide a simple and efficient device for use in conducting surveys designed to test the mental retention of prospective consumers to advertisement literature.

It is also an object of this invention to provide a tamper proof survey device for testing mental retention and public response to a particular exhibit after visual examination thereof.

It is a further object of this invention to provide a survey device for testing mental retention of individuals without requiring the constant presence of a surveyor during the survey period.

Figure 6:
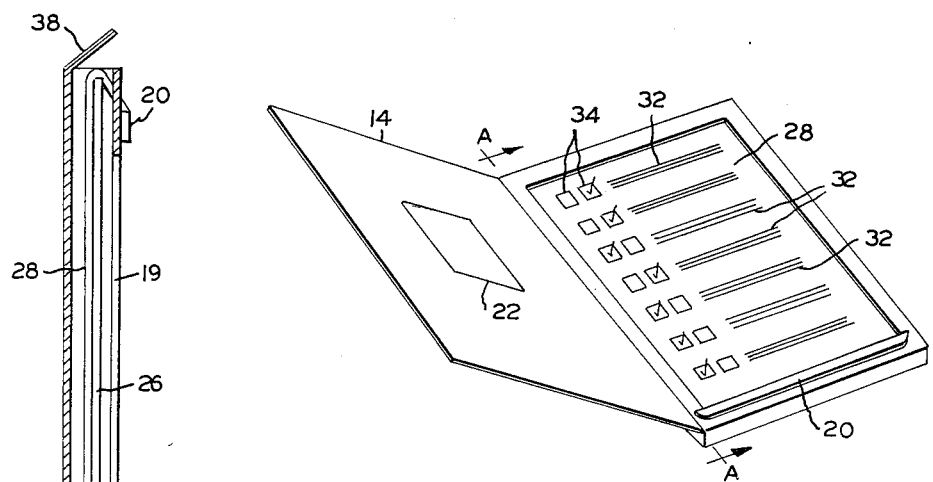
Figure 7:
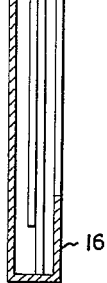

Additional objects, advantages, and features of this invention reside in the particular construction, combination of elements, and arrangement of parts which will become more apparent in the following detailed description taken in connection with the accompanying drawings, in which:

FIG. 1 is a top perspective view of the survey device of the present invention as it appears in closed book, compact form, FIG. 2 is a top perspective view of the survey device as it appears to an individual being surveyed immediately upon opening, FIG. 3 is a companion view of FIG. 2 indicating further a cover page, FIG. 4 is a top persepective view indicating how an exhibit to be surveyed is inserted into the survey device, FIG. 5 is a top perspective view indicating a survey chart being drawn from hidden position, FIG. 6 is a top perspective view of the survey device as it appears with the survey chart in exposed, locked position, and FIG. 7 is a sectional view taken along lines A—A of FIG. 6 indicating in detail the internal combination of elements of the survey device of this invention.

Referring to the drawings in which like numbers represent like elements in the several views, FIG. 1 shows survey device 10 in closed book form as it may appear with any suitable commentary 12 on outside cover leaf 14 thereof.

FIG. 2 further illustrates survey device 10 as it appears to an individual being surveyed immediately upon opening cover leaf 14 which is pivotally attached along one edge thereof to frame 16 which forms an envelope for cover page 18 and other elements described in detail hereinafter. The inner edges 17 and 19 of frame 16 provide runners for tabs 21 and 23 of handle 20. Instruction label 22 is also desirably included on cover leaf 14 for indicating the prescribed method the individual being surveyed must follow in operating the survey device.

The various elements of survey device 10 comprising the outer construction thereof as well as operating elements may be formed of heavy paper, cardboard or stiff plastic which may be glued or otherwise fixed to form the indicated construction in any desired fashion.

FIG. 3 further illustrates the construction of FIG. 2 with cover page 18 as it appears on opening to expose exhibit 24 being surveyed there beneath. Although cover page 18 is not essential to the construction of the present invention, it is desirably included to provide more versatility to the survey device and prevent binding or accidental removal of the exhibits which may result in instances when loosely fixed or small exhibits are being surveyed.

FIG. 4 further illustrates exhibit 24 appearing as a booklet but which may also appear, however, as a label, diagram, or the like inserted in survey device 10 within cover page 18 and partition insert 26. The exhibit may be adhesively fixed to partition insert 26 or may be loosely inserted therein to provide additional versatility to the survey device for re-use in surveying a multiple number of exhibits without damaging the partition insert.

FIG. 5 illustrates survey chart 28 as it is drawn to exposed, locked position by handle 20 which may be either an integral part of survey chart 28 or which may be a separate fixture adhesively attached thereto.

FIG. 6 further illustrates the construction of FIG. 5 showing survey chart 28 drawn in exposed, locked position and disclosing various questions appearing as lines 32 with conveniently provided answer columns indicated as squares 34.

FIG. 7 shows a sectional view taken along lines A—A of FIG. 6 to more clearly illustrate the internal construction of the present survey device indicating survey chart 28 in closed unexposed position about partition insert 26. Frame 16 envelopes partition insert 26 and survey chart 28 and includes as an integral part thereof, solid back 36 and top flap 38 which may be designed to provide access to the survey chart for removing and re-programming survey device 10.

In operation, the survey device of the present invention may be shipped, for example, by mail to a prospective individual to be surveyed. The survey device is received in closed book form such as is indicated in FIG. 1. Upon opening the survey device such as is shown in FIG. 2, the individual being surveyed reads instructions 22 which discloses that the individual carefully consider the exhibit hidden from view under cover page 18 for the purpose of answering various survey questions, also hidden from view, on survey chart 20. After opening cover page 18 and carefully considering exhibit 24 located thereunder, the individual closes cover page 18 over exhibit 24 and proceeds to pull handle 20 exposing survey chart 28 such as is shown in FIG. 5. Once the survey chart is pulled over cover page 18 to expose the questions of the survey, difficulty will be experienced in attempting to return the survey chart to its original position as binding of survey chart 28 will occur between back 36 and partition insert 26.

Upon pulling survey chart 28 to completely exposed and fully secured position such as is indicated in FIG. 6, the individual next considers the questions located on the survey chart and answers the questions by indicating answers in a suitably provided location such as squares 34 indicated in FIG. 6 and appearing on the questionnaire as favorable and unfavorable responses.

The critical feature of the present invention resides in the fact that once the questions of the survey chart are exposed to the individual being surveyed, only the mental retention of the individual is relied upon as no further examination of the exhibit is possible.

After the questions of the survey have been answered, the individual may then return the survey device to the surveyor who may remove the chart by opening sealed flap 38. The survey device may be re-programmed, if desired, by placing a new survey chart in position such as shown, survey chart 28 of FIG. 7, and the procedure previously outlined repeated with regard to another individual and/or another exhibit.

It is to be understood that the foregoing detailed description is given merely by way of illustration and that many variations may be made therein without departing from the spirit of this invention.

What is claimed is:

1. A survey device for examining mental retention of individuals which comprises in combination, an envelope, a frame formed on one side of said envelope, a partition disposed within said envelope, slide means disposed within said frame portion, a flexible survey chart secured to said slide means, said flexible survey chart positioned about said partition insert within the envelope such that said flexible chart may be drawn in only one direction within the said frame and an exhibit, said exhibit positioned within said frame and on the partition insert.

2. A survey device for examining mental retention of individuals which comprises in combination, an envelope having a back portion and a front frame portion, a partition insert disposed between said front and said back portions, slide means disposed within the front frame portion, a flexible survey chart securely fixed to said slide means and originally positioned between said partition insert and said back portion such that the flexible survey chart may slide in only one direction into exposed position within the front frame portion of the enevelope and an exhibit, said exhibit positioned within said front frame and on the partition insert.

3. A survey device for examining mental retention of individuals which comprises in combination, an envelope having a back portion and a front frame portion, a partition insert disposed between said front and said back portions, a slide bar having tabs engaging opposite sides of said front frame portion, a flexible survey chart securely fixed to said slide bar and originally positioned between said partition insert and said back portion such that the flexible survey chart may only be drawn in one direction, and an exhibit, said exhibit positioned between said partition insert and said front frame portion such that said flexible survey chart may be drawn thereover.

4. A survey device for examining mental retention of individuals which comprises in combination, an envelope having a back portion and a front frame portion, a cover flexibly attached to said front frame portion near one side thereof, a partition insert disposed between said front and said back portions, a slide bar having tabs engaging opposite sides of said front frame portion, a flexible survey chart securely fixed to said slide bar and originally positioned between seaid partition insert and said back portion such that the flexible survey chart may be drawn in one direction, an exhibit, said exhibit positioned within said front frame portion and on the partition insert, and a cover page, said cover page positioned within said front frame portion such that said flexible survey chart may be drawn thereover.

References Cited by the Examiner

UNITED STATES PATENTS

| 917,136 | 4/1909 | Robertson | 281—44 X |
| 1,302,719 | 5/1919 | Schaff | 281—44 |
| 1,971,684 | 8/1934 | Hoppe | 281—44 |
| 2,238,408 | 4/1941 | Ackert | 281—44 |
| 3,146,532 | 9/1964 | Shwisha et al. | 35—9 |

LAWRENCE CHARLES, *Primary Examiner.*